United States Patent [19]

Büchi

[11] Patent Number: 4,912,941
[45] Date of Patent: Apr. 3, 1990

[54] METHOD AND APPARATUS FOR EXTRACTING AND UTILIZING GEOTHERMAL ENERGY

[76] Inventor: Hans F. Büchi, Rotfluhstrasse 47, 8702 Zollikon, Switzerland

[21] Appl. No.: 153,247

[22] Filed: Feb. 8, 1988

[30] Foreign Application Priority Data

Jul. 22, 1987 [CH] Switzerland .................. 2785/87

[51] Int. Cl.$^4$ ............................................. F25D 23/12
[52] U.S. Cl. ........................................ 62/260; 165/1; 165/45
[58] Field of Search ................... 62/260; 165/45, 1, 76

[56] References Cited

U.S. PATENT DOCUMENTS

| | | | |
|---|---|---|---|
| 3,809,149 | 5/1974 | Deutsch ........................... | 62/260 X |
| 4,030,549 | 6/1977 | Bouck ................................. | 166/280 |
| 4,244,805 | 9/1980 | Rothwell ............................. | 62/260 |
| 4,715,429 | 12/1987 | Mogensen ........................ | 62/260 X |

Primary Examiner—Henry A. Bennet
Attorney, Agent, or Firm—Richard G. Lione

[57] ABSTRACT

A method for extracting and utilizing geothermal energy present in the earth's interior is based on at least one essentially vertical bore hole into the ground, the bottom zone of which is provided with penetrating passages into the surronding rock. A heat-conducting substance is forced into the penetrating passages. At least one supply and one return line for a heat transmission medium is thermally linked with the heat-conducting substance and the surrounding rock. The heat transmission medium is conveyed in a circuit in which part of its heat content is extracted and industrially utilized before reintroducing the fluid into the ground.

3 Claims, 3 Drawing Sheets

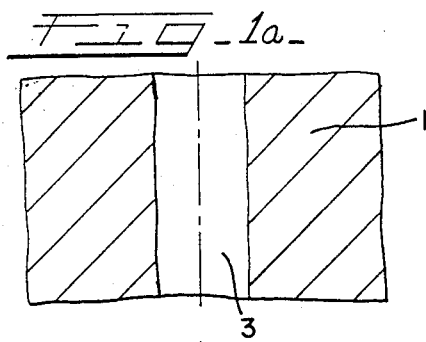
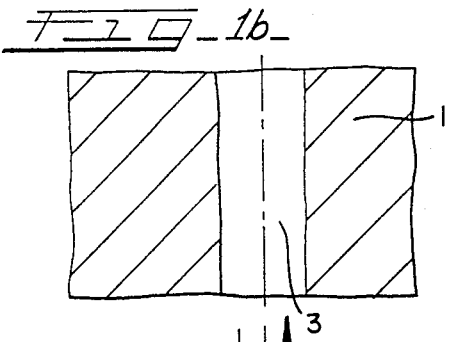
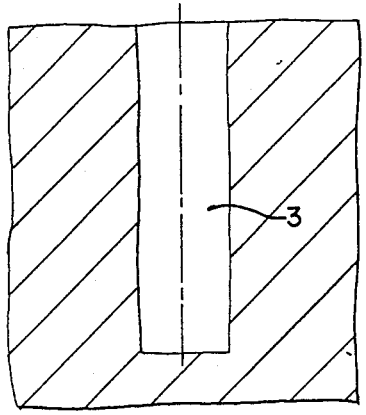
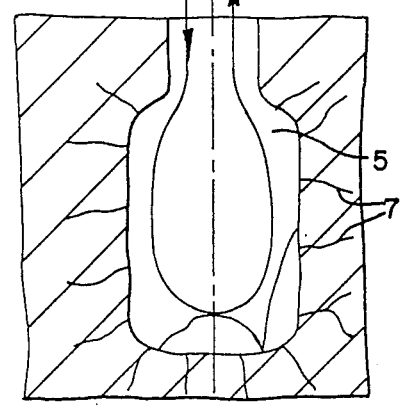
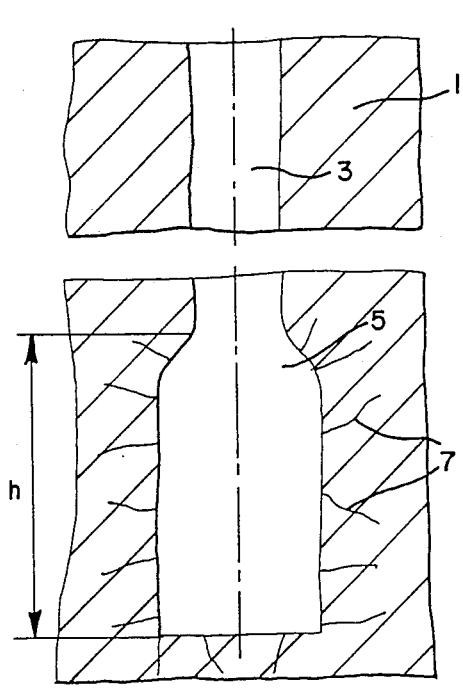
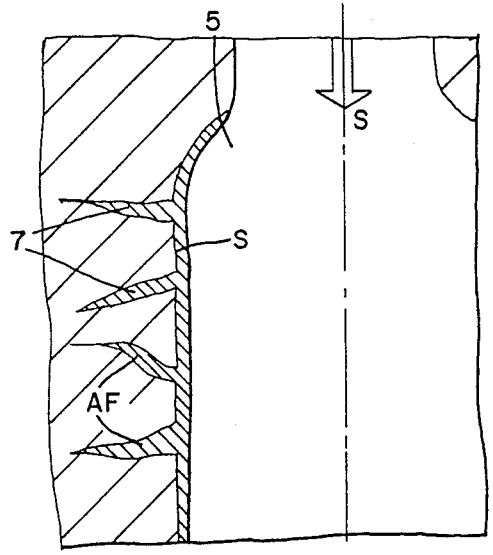

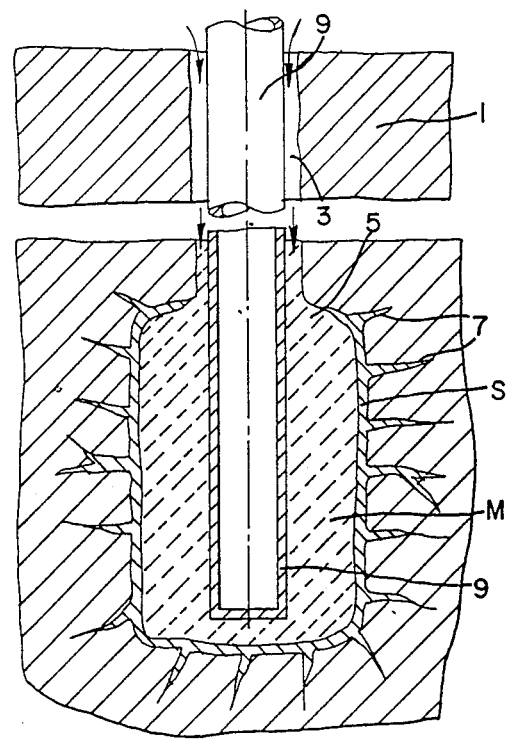
FIG_3_
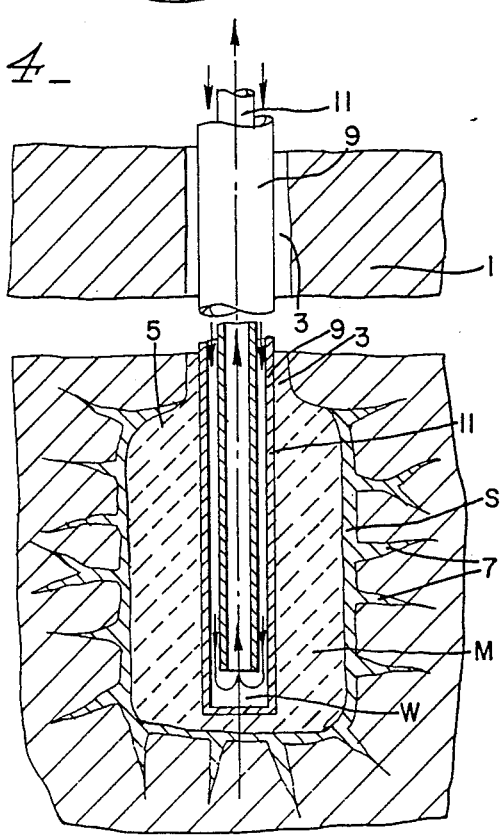
FIG_4_

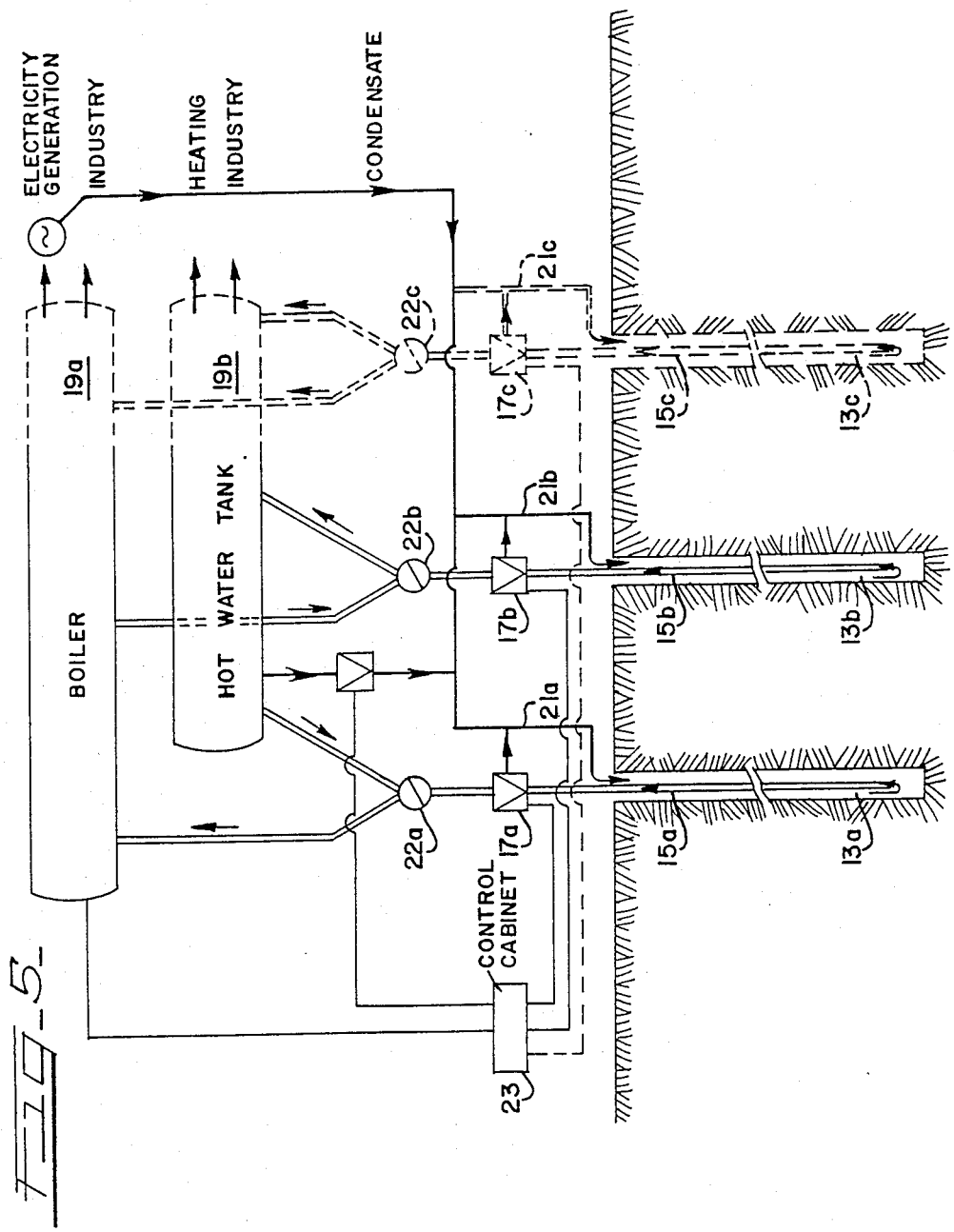

METHOD AND APPARATUS FOR EXTRACTING AND UTILIZING GEOTHERMAL ENERGY

FIELD OF THE INVENTION

The invention relates to a method of extracting and utilizing thermal energy present in the earth's interior, and to a geothermal plant for practicing the method.

BACKGROUND OF THE INVENTION

The extraction and utilization of geothermal heat in existing heat plants, and in heat pumps, is well known. Existing geothermal heat plants extract heat from deep in the earth in the form of hot water or steam which has flowed through geological rock formations containing geothermal heat, i.e., natural hot water or steam present in the ground. This sometimes produces a very toxic condensate which poses serious environmental problems.

In contrast, with heat pumps it is an established practice to use heat exchangers with considerable surface area at a relatively shallow depth so that, in spite of a comparatively small temperature gradient, it is possible to obtain a reasonable degree of efficiency. Because of structural limitations in known heat pump installations, however, the amount of surface contact area available between the heat transmission medium and the earth's interior is relatively small; a factor which limits the degree of efficiency attainable with such plants.

SUMMARY OF THE INVENTION

An object of the present invention is to provide an improved method of extracting and utilizing geothermal energy.

Another object is to provide such a method which is considerably more efficient than the methods presently known.

A further object is to provide a geothermal plant for performing this method.

The method involves drilling a bore hole into the earth. In the bottom zone of the hole, passages are formed outwardly from the hole and penetrate into the surrounding rock. A heat-conducting substance is then injected into these passages from the bottom zone. A supply line and a return line for a heat transmission medium are provided in the bore hole, between the earth's surface and the bottom zone. The heat transmission medium is conveyed, in a closed circuit, to a heat exchanger at or near the bottom of the bore hole to extract part of its heat before recycling.

To achieve the desired results the bore hole is drilled more than 1,500 meters into the earth. Preferably, it is drilled at least 5,000 meters into the earth. At the bottom zone of the bore hole penetrating passages are formed and extend outwardly into the rock, in the shape of large and small clefts and rifts, etc.

These penetrating passages are filled, to a large extent, with the heat-conducting substance. There results, in the bottom zone, a significant increase in contact area (in comparison with the cylindrical periphery of the bore hole), resulting in higher heat extraction from the surrounding rock. Greater heat flow results because of the better thermal conductance of the hardened substance which, practically speaking, is a plug of fissured rock in which the heat-conducting substance filling the crevices absorbs heat, in a concentrated way, from the surroundings.

For drilling a bore hole that is preferably deeper than 1,500 meters, e.g., from 5,000 meters to 10,000 meters deep, techniques known for petroleum extraction and for other purposes in deep oil wells are used. Penetrating passages are then formed in a region 1,500 meters to 2,000 meters long in the bottom portion of the bore hole by blasting, rock fracturing with high pressure liquids, gases or grouts, or other methods. These passages are then present in addition to those which exist naturally.

To produce a lengthy bottom zone surrounded by penetrating passages (created according to one of these methods), the surrounding rock is alternately broken up by blasting and then flushed out. This is done in stages up from the bottom, after each one of which the hole is redrilled.

The passages are then filled with a heat-conducting substance. The heat-conducting substance is preferably made up of water and cement as a base, and incorporates one or more of a siliceous gel and finely divided metal powder, preferably silver and/or copper and/or aluminum powder. This substance, in fluid form, is used for pressure grouting. After injection it is left to solidify.

A closed-bottom casing is then inserted into the bore hole and bonded thermally to the heat-conducting substance. Specifically, the bottom zone may be blasted or reamed to a greater diameter than the casing in order to form a roughly cylindrical underground chamber. The casing is then grouted to the surrounding rock (where the heat-conducting substance fills the penetrating passages) with a contact matrix, preferably cement with a strongly heat-conductive admixture of metal and/or a silicate. The casing forms the outer surface for a heat exchanger.

A heat transmission medium return line in the form of an inner pipe is inserted into the supply pipe. As distinguished from the latter, the inner pipe is open at the bottom.

The heat transmission medium is driven downward between the walls of the supply pipe and the return line where it absorbs heat, owing to the temperature difference between the medium and the rock in the bottom zone of the bore hole, with its enhanced heat conveyance capacity. With a view to losing as little heat as possible during the ascent of the hot transmission medium in the return pipe, the return pipe is, at least in its upper reaches, thermally insulated. Preferably at least one or more of a special steel, asbestos-cement, or a synthetic resin is used for this purpose.

The heat transmission medium may be water, for the sake of convenience. If necessary it contains corrosion inhibiting ingredients. Absorbed heat is transported by way of steam, or hot water, to the surface of the earth where it may be used in one f several well-known methods. When the steam has condensed, the water is reintroduced into the closed circuit and led to the bore hole.

Because a given quantity of heat per unit of time determined by exchange surface area, temperature gradient in the bottom zone of the bore hole, and the temperature of the heat transmission medium in that area, flows through the system, it is evident that the higher the flow rate of heat transmission medium the lower will be the temperatures in the ascending fluid. In many cases, however, it is desirable to effect heat recovery at as high a temperature as possible. To this end, according to the invention, heat transmission medium may be alternately fed into and withdrawn from at least two separate bore holes of the type previously described.

This results in a pulsating flow of the heat transmission medium. In such case, the heat transmission medium circulates in a closed circuit in one bore hole while it is temporarily not used for heat extraction. Its temperature rises to the level required for profitable heat extraction. In the meantime the energy is extracted from the heat transmission medium circulating in another bore hole. The pressure in the heat transmission medium (circulating in the idle bore hole) is preferably used as a criterion for deciding when to cut it into active heat extraction operation.

BRIEF DESCRIPTION OF THE DRAWINGS

The invention is hereafter illustrated by diagrams, of which:

FIGS. 1a-1c illustrate schematically in three steps, according to the requirements of the invention, the establishment of a bore hole driven into the earth's interior and penetrating passages formed outwardly from its bottom zone;

FIG. 2 illustrates a schematically enlarged representation of a bore hole, fitted out according to the requirements of the invention with penetrating passages grouted with appropriate heat-conducting substance;

FIG. 3 illustrates schematically the insertion of a closed bottom casing into the bore hole, according to the requirements of the invention;

FIG. 4 illustrates schematically a bore hole, its treatment completed by a method as shown in FIGS. 1-3, and with the addition of a heat transmission return line, according to the requirements of the invention; and FIG. 5 illustrates schematically a geothermal plant with several bore holes, according to the invention, where the heat to be extracted from the different bore holes is regulated as required for obtaining an approximately continuous yield.

DESCRIPTION OF THE PREFERRED EMBODIMENT

As seen in FIG. 1a, a deep bore hole 3 is driven into the bedrock 1 considerably deeper than 1,500 meters, preferably from 5,000 meters up to 10,000 meters. Then, as seen in FIG. 1b, the surrounding rock in the bottom zone 5 of the bore hole 3 is provided with penetrating passages 7, consisting of clefts, rifts, capillary cracks, etc., preferably by blasting or fluid pressure rock fracturing in bottom zone 5.

The blasting may be performed by slow delayed blasting or, e.g., by the Bristar method. It is preferably followed by washing with chemicals, especially an acid.

By such blasting, the ground is loosened in the bottom zone 5 and the desired rifts and clefts are formed. This loosening generally starts at the bottom of the bore holes, gradually advancing upward to a height of, e.g., 1,000 meters from the lower bore hole end. The rock material crumbling into the bore hole after blasting is flushed out from above by a pressurized agent, preferably water, as schematically depicted in FIG. 1b, or else the bore hole is repeatedly redrilled in its base zone. For the drilling of these deep bore holes it is necessary to resort to techniques known, e.g., from deep oil well drilling.

When the roughly cylindrical bottom zone 5, as shown in FIG. 1c, has reached the necessary height, a highly heat-conducting substance S is injected into it, as shown schematically in FIG. 2. This substance S enters into the remaining open penetrating passages 7, filling them to a large extent. It hardens and forms a heat-conducting connection from a spongy exchange zone AF towards the axis of the bottom zone 5. At the same time, the interior wall of the bottom zone 5 of the bore hole, as shown in FIG. 2, is coated with the heat-conducting substance S.

The heat conducting substance is injected as a fluid, preferably using water as a carrier. The substance is introduced from above into the penetrating passages 7, i.e, clefts, pores, etc. The substance preferably comprises a siliceous gel and metal powder in the form of finely divided silver, and/or aluminum, and/or copper.

After evaporation or setting of the carrier fluid, the more-or-less solid, heat-conducting substance S remains in the connecting passages 7 and in the clearance between the wall surface of the bore hole's bottom zone 5 and the external face of the casing tube, spreading sponge-like into the bedrock. The contact surface AF between the bore hole and the surrounding ground is enlarged and the rate at which heat can be extracted is drastically increased.

Referring to FIG. 3, a first, closed-end casing 9 is inserted into the bore hole 3 which, as previously discussed, is already treated with the heat-conducting substance S. This casing 9 has to be highly heat-conducting in its lower section, e.g., metallic.

By introduction of an appropriate compound M, the exterior face of the casing 9, in bottom zone 5, is then brought into close contact thermally with the rock of bottom zone 5 and with the heat-conducting substance S. The compound M should contain mainly cement and/or a siliceous substance, interspersed with metal powder, metal fibers, etc. This substance M is injected under pressure along the exterior face of casing 9 as schematically depicted in FIG. 3.

FIG. 4 shows the completed bore hole prepared according to the requirements of the invention. After having thermally joined the casing 9 to the surrounding rock by heat-conducting substance M, a return pipe 11 with an open bottom is inserted. This pipe 11 is insulated, especially in the upper zone (below the ground surface), so that a minimum of heat exchange occurs between the heat transmission medium W flowing down in the annular space between the casing 9 and the return pipe 11 on the one hand, and the medium ascending to the surface in the return pipe 11, on the other hand. To this end, the return pipe 11 is fabricated either of a special steel, of asbestos-cement and/or a synthetic resin, or insulated by it.

The heat transmission medium W is driven down between the interior wall of the casing 9 and the exterior face of the return pipe 11, and rises again in return pipe 11 for the transportation of heat from the earth's interior to the surface of the earth, as depicted. Because of the large contact surface, enhanced by penetrating passages 7 spreading outwardly, a considerable quantity of heat is fed from natural rock, the heat-conducting substance S and the heat-conducting contact substance M to the heat transmission medium W.

The recirculation of the heat transmission medium and the extraction of heat at the surface of the earth is performed by one of the well-known methods, e.g., in steam power plants, district heating, etc. The heat transmission medium consists of water or other low-boiling liquids that evaporate in the bottom zone 5, condense after extraction of the exploitable heat, and flow in closed circuit through the bore hole.

The bore hole, prepared and fitted out according to the requirements of the invention with the aforedescribed devices, forms a geothermal "furnace", with a high efficiency. It is possible to extract a considerable quantity of heat from the earth, per unit of time, owing to a contact surface that is much larger than the cylindrical surface of the bore hole casing 9 itself, and the resulting greater heat inflow from the bedrock to the transmission fluid which carries heat to the surface.

FIG. 5 illustrates a further alternate layout of a geothermal plant, according to the requirements of the invention. It comprises, e.g., three geothermal exploitation bore holes 13a–13c, each preferably constructed as depicted in FIGS. 1–4. These bore holes can be hydraulically connected or operated separately.

In the event that natural, open cross-channels are formed in the rock between closely spaced bore holes, e.g., in Karstic formations, a circulation flow can be established between them by introduction of a heat-conducting liquid through one bore hole and withdrawal of the heated liquid, or steam, from a neighboring bore hole. This arrangement can result in a dramatic increase in heat extraction from the earth, in comparison to the embodiment forming the initial subject of this application, where heat is recovered from each bore hole separately. By means of preliminary geological studies bore holes may be situated in locations where Karstic formation is expected, at depths favorable for heat exploitation and/or preferably in rocks of high thermal conductivity, such as granite.

In the preferred embodiment of the invention, heat transmission medium return pipes 15a–15c are linked, through control valves 17a–17c, to heat utilization units 19a and 19b, or are coupled in closed circuit to feed pipes 21a–21c for returning the heat transmission medium directly to bore holes 13a–13c. Valves 17a–17c are connected to a control unit 23 so that some of the born holes can be operated in closed circuit without being looped to extraction units 19b and 19c.

In this case the temperature of the medium rises asymptotically to a high level corresponding to the rock temperature in the bottom zone 5 (FIG. 1b), whereas other bore holes, whose heat transport media have already attained the necessary exploitable temperature, are changed over to extraction units 19a and 19b by control unit 23 and valves 17a–17c. The control unit 23 can be temperature controlled and/or pressure controlled. The pressure, and/or the temperature, is sensed in the pipes conducting heated liquid from the respective bore holes and connection to extraction units 19a and 19b is established when the pressure and/or temperature, has risen to a predetermined level.

The increase of thermal conductivity of the rock mass through injection of metals in natural openings intercepted by the bore holes, or created by blasting the rock in place, may be roughly determined by cursory calculations, depending on the kind of rock. The increase in natural conductance amounts to approximately 2–10 fold in basalt, and 2–6 fold in granite.

The lower value corresponds to using aluminum as the metal for injections, the higher values for copper or silver. These multipliers can be achieved, or exceeded, near the bore hole walls, and diminish more or less rapidly with increasing distance from the bore hole, depending on ground conditions.

The results of calculations depend essentially on the content of groutable clefts in the rock around the bore holes. By suitable choice of intensity and sequence of blasting in the bore holes, every effort can be made to create a high percentage of penetrating passages and their wide-ranging extent in a connected network. Where the kind of rock and the regard for environmental concerns allow it, a leaching, i.e., widening and smoothing of the rock surfaces of clefts, by flushing out with acids or other solutions of chemical compounds, is envisaged.

It will be necessary to interpose separators 22a–22c in front of the heat extraction units in the heat-conducting conduits for separation of hot water and steam, as is normal in existing geothermal plants that exploit natural hot water (hot springs) and steam resources in the underground, e.g., geysers. The hot water is carried off directly for industrial use, heating of buildings, agricultural application, etc., or reintroduced into the bore holes. The steam eliminated in the separator arrives at the pressure equalizing and storage tank (boiler) and serves for electricity generation and/or use in industrial processes.

With the depicted method for exploitation of thermal energy available in the earth's interior and the geothermal power plant based on it, it is possible to produce energy with high efficiency without significant environmental abuse. Geothermal plants built on this principle are as innocuous as existing hydroelectric or thermoelectric power stations, yet far more ecologically beneficial than the latter.

I claim:

1. A method of extracting thermal energy from the earth's interior for use on the surface, comprising the steps of:
    (a) drilling a bore hole downwardly into the earth;
    (b) forming penetrating passages outwardly from the bore hole in addition to existing penetrating passages by fracturing rocks surrounding the bore hole with fracturing means in the bore hole;
    (c) flushing out existing penetrating passages and those formed by fracturing with fluid means under pressure;
    (d) redrilling the bore hole and forming additional penetrating passages by fracturing rocks surrounding the drill hole with fracturing means in the bore hole;
    (e) flushing out existing and newly formed penetrating passages again;
    (f) forcing a substance into the penetrating passages in the form of a slurry comprising a carrier liquid, binding material and particulate material which is highly conductive of heat;
    (g) permitting the slurry to harden in the passages;
    (h) inserting outer pipe into the bore hole and grouting the pipe to the hardened slurry in said passages and to the rocks surrounding it with a grout containing highly conductive, particulate material;
    (i) enlarging a bottom zone of the bore hole by under-reaming or by blasting;
    (j) inserting inner pipe into said outer pipe to a depth near the bottom of said bottom zone; and
    (k) conveying a heat transmission medium down one passage inside at least one of said pipes and up another passage inside at least one of said pipe so that the medium picks up heat in the bottom region of said hole and brings it up to the surface of the earth.

2. The method of claim 1 further characterized in that said heat conducting substance comprises water and cement and one or more of a siliceous gel and a particulate metal powder which is preferably silver and/or copper and/or aluminum.

3. The method of claim 1 further characterized by and including the steps of:

(a) drilling at least two bore holes and performing the other steps recited in claim 20 in each of those bore holes; and (b) alternately conveying heat transmission medium into and out of each of said bore holes to and from a common power plant.

* * * * *

UNITED STATES PATENT AND TRADEMARK OFFICE
CERTIFICATE OF CORRECTION

PATENT NO. : 4,912,941
DATED : April 3, 1990
INVENTOR(S) : Hans F. Buchi

It is certified that error appears in the above-identified patent and that said Letters Patent is hereby corrected as shown below:

In column 2, line 53, please delete "f" and substitute therefor --of--.

COLUMN 8:
In claim 3, line 4, please delete "20" and substitute therefor --1--.

Signed and Sealed this

Eighth Day of September, 1992

Attest:

DOUGLAS B. COMER

Attesting Officer

Acting Commissioner of Patents and Trademarks